United States Patent
Celo (10) Patent No.: US 9,448,422 B2
(45) Date of Patent: Sep. 20, 2016

(54) INTEGRATED THERMO-OPTIC SWITCH WITH THERMALLY ISOLATED AND HEAT RESTRICTING PILLARS

(71) Applicant: Huawei Technologies Co., Ltd., Shenzhen (CN)

(72) Inventor: Dritan Celo, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 14/197,301

(22) Filed: Mar. 5, 2014

(65) Prior Publication Data
US 2015/0253510 A1 Sep. 10, 2015

(51) Int. Cl.
| | |
|---|---|
| *G02F 1/01* | (2006.01) |
| *G02F 1/225* | (2006.01) |
| *G02B 6/35* | (2006.01) |
| *G02B 6/12* | (2006.01) |
| *G02F 1/21* | (2006.01) |

(52) U.S. Cl.
CPC .............. *G02F 1/0147* (2013.01); *G02B 6/12* (2013.01); *G02B 6/3576* (2013.01); *G02B 6/3582* (2013.01); *G02B 6/3596* (2013.01); *G02F 1/225* (2013.01); *G02B 2006/12038* (2013.01); *G02B 2006/12145* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 5,418,868 A * | 5/1995 | Cohen | ................... | G02F 1/3136 385/130 |
| 6,093,334 A * | 7/2000 | Suzuki | .................... | G02F 1/011 216/11 |
| 6,847,750 B1 * | 1/2005 | Baumann | ................. | G02F 1/011 385/129 |
| 7,565,038 B2 * | 7/2009 | Earnshaw | ............... | G02F 1/225 385/1 |
| 7,630,596 B2 * | 12/2009 | Watanabe | ............. | B81B 3/0081 216/2 |
| 8,150,218 B2 * | 4/2012 | Takahashi | ............... | G02F 1/011 385/1 |

(Continued)

FOREIGN PATENT DOCUMENTS

| | | |
|---|---|---|
| CN | 1601384 A | 3/2005 |
| CN | 101334502 A | 12/2008 |

(Continued)

OTHER PUBLICATIONS

Fang, Q. et al., "Ultralow Power Silicon Photonics Thermo-Optic Switch With Suspended Phase Arms," IEEE Photonics Technology Letters, vol. 23, No. 8, Apr. 15, 2011, 3 pages.

(Continued)

*Primary Examiner* — Michelle R Connelly
(74) *Attorney, Agent, or Firm* — Slater Matsil, LLP (57) ABSTRACT

System and method embodiments are provided for a thermo-optic switch with thermally isolated and heat restricting pillars. The embodiments enable increased integration density in photonic integrated chips (PICs), reduced power consumption, improved switching speed, and increased chip lifetime. In an embodiment, an optical waveguide; a resistive heater in thermal contact with a surface of the optical waveguide; and a plurality of heat flow restricting pillars connected to the sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars.

23 Claims, 8 Drawing Sheets

(56) References Cited

U.S. PATENT DOCUMENTS

| | | |
|---|---|---|
| 2004/0258344 A1 | 12/2004 | Fardi et al. |
| 2004/0264836 A1* | 12/2004 | Kawashima ....... G02B 6/12011 385/14 |
| 2008/0181550 A1 | 7/2008 | Earnshaw |
| 2009/0003754 A1 | 1/2009 | Watanabe |
| 2009/0016674 A1 | 1/2009 | Watanabe |
| 2009/0297092 A1* | 12/2009 | Takahashi ............. G02F 1/0147 385/14 |
| 2010/0111461 A1* | 5/2010 | Takahashi ............... G02F 1/011 385/1 |

FOREIGN PATENT DOCUMENTS

| | | | |
|---|---|---|---|
| CN | 101344612 A | | 1/2009 |
| CN | 101600983 A | | 12/2009 |
| EP | 0653665 A1 | | 5/1995 |
| JP | 01158413 A | * | 6/1989 |
| JP | 2004021249 A | * | 1/2004 |
| JP | 2006030733 A | | 2/2006 |
| JP | 2007025583 A | | 2/2007 |

OTHER PUBLICATIONS

Sun, P. et al., "Submilliwatt Thermo-Optic Switches Using Free-Standing Silicon-on-Insulator Strip Waveguides," Optics Express 8406, vol. 18, No. 8, Apr. 12, 2010, 6 pages.

International Search Report and Written Opinion of the International Searching Authority received in Patent Cooperation Treaty Application No. PCT/CN2015/073580 mailed May 27, 2015, 13 pages.

* cited by examiner

INTEGRATED THERMO-OPTIC SWITCH WITH THERMALLY ISOLATED AND HEAT RESTRICTING PILLARS

TECHNICAL FIELD

The present invention relates to a thermo-optic switch, and, in particular embodiments, to a system and method for thermally isolating a thermo-optic switch.

BACKGROUND

An optical switch is a switch that enables signals in optical fibers or integrated optical circuits (IOCs) to be selectively switched from one circuit to another. They are utilized widely in the telecommunications industry. 1×2 and/or 2×2 optical switches are vital components in wavelength-division multiplexing (WDM) systems, especially in reconfigurable structures. Optical networks have enormous capacities, but the high packaging costs of optical devices limit the application. Increasing integration density reduces the cost of photonic integrated circuits (PICs) and packaging. Reducing the power consumption of individual optical components allows for higher integration density. Therefore, it is desirable to develop an optical switch with ultralow power consumption.

SUMMARY

In accordance with an embodiment, a thermo-optic switch includes an optical waveguide; a resistive heater in thermal contact with a surface of the optical waveguide; and a plurality of heat flow restricting pillars connected to the sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars.

In accordance with an embodiment, a network component configured for manipulating optical signals includes a processor; a receiver connected to the processor; and a photonic integrated circuit (PIC) connected to the receiver, wherein the PIC comprises a plurality of thermo-optical switches, wherein each of the thermo-optical switches comprises: an optical waveguide; a resistive heater in thermal contact with a surface of the optical waveguide; and a plurality of heat flow restricting pillars connected to the sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars.

In accordance with an embodiment, a photonic integrated circuit (PIC) includes a plurality optical inputs; and a plurality of thermo-optic switches connected to the inputs, wherein each of the thermo-optic switches comprises: an optical waveguide; a resistive heater in thermal contact with a surface of the optical waveguide; and a plurality of heat flow restricting pillars connected to the sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Current PIC chips include Mach-Zehnder interferometer (MZI) thermo-optic (TO) switches with switch cell size of approximately 200 micrometers (μm)×530 μm (i.e., approximately 0.106 mm$^2$). The power consumption of this switching is about 20-40 milliwatts (mW). In an embodiment, disclosed herein are optical switches that enable greater than 6000 switches per die with a switch cell size of approximately 100 μm×400 μm with a switching power of about 0.3-0.5 mW.

Disclosed herein are optical switches that substantially minimize the power required to change the switch state as compared to prior optical switches. Furthermore, embodiments of the disclosed optical switch increase the density of optical switches, reduce the switching time and insertion loss of optical switches as compared to prior optical switches, and enhance the mechanical stability lifetime operation of the optical switch.

Disclosed herein is a thermo-optic switch that includes heat flow restricting pillars to support a phase tuning element or thermo-optic (TO) switching element with a heat flow reducing deep trench on the silicon dioxide (SiO$_2$) (also referred to as silica) to thermally isolate the heat restricting pillars from each other. This provides a device with enhanced high-thermal resistivity ($R_{th}$) paths to increase heat confinement into a TO switching element, thereby resulting in reduced overall power consumption and device footprint.

Figure 1:
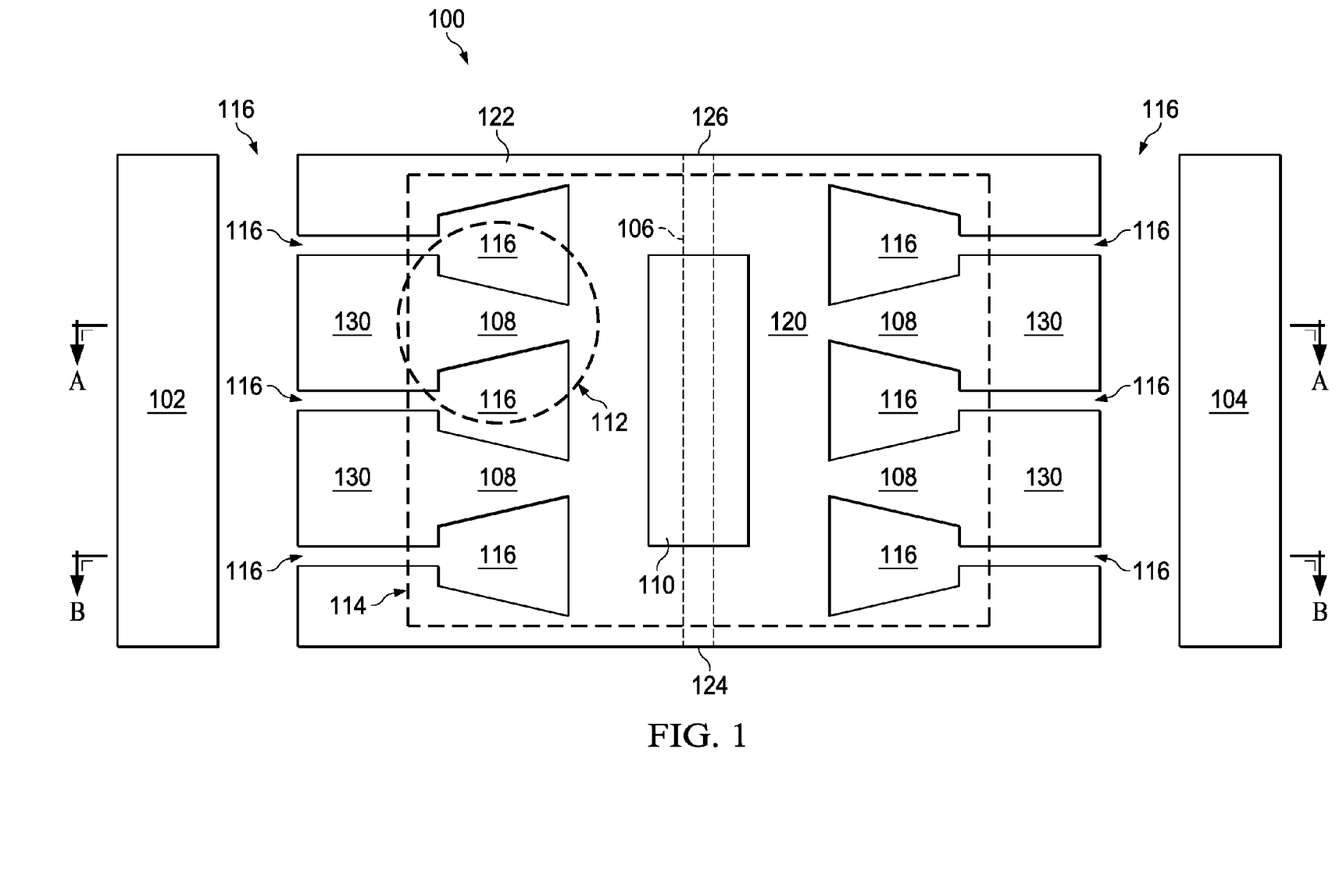
FIG. 1 is a diagram of a top view of an embodiment thermo-optic switching element.
Figure 2:
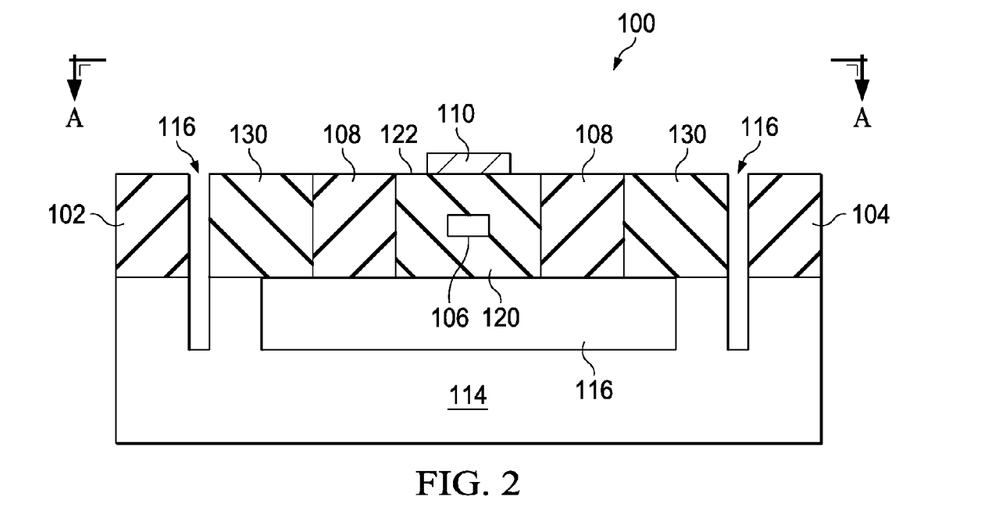
FIG. 2 is a diagram of a cross-section view of section A-A of an embodiment thermo-optic switching element.
Figure 3:
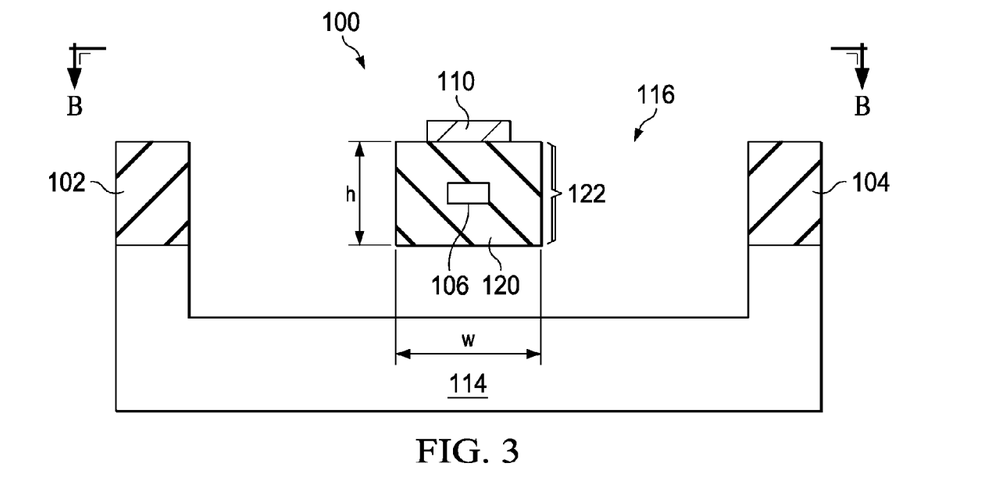
FIG. 3 is a diagram of a cross-section view of section B-B of an embodiment thermo-optic switching element.

FIG. 1 is a diagram of a top view of an embodiment thermo-optic switching element 100. FIG. 2 is a diagram of a cross-section view of thermo-optic switching element 100 through section A-A. FIG. 3 is a diagram of a cross-section view of thermo-optic switching element 100 through section B-B. TO switching element 100 includes silicon substrate 114, a silicon dioxide layer 102, 104, a substantially free standing silicon-on-insulator (SOI) waveguide 122, and a thermal strip heater 110 covering a section of the SOI waveguide 122. In an embodiment, the thermal strip heater 110 is a metal, such as, for example, platinum. In an embodiment, the thermal strip heater 110 is about 200 nanometers (nm) with a width of about 2.9 microns, and a length of about 100 microns. In an embodiment, the TO switching element 100 is incorporated in a Mach-Zehnder interferometer (MZI) TO switch. In an embodiment, the thermal strip heater 110 covers a top section of the SOI waveguide 122, where top indicates an opposite side from the side at which a substrate is located, which is considered the bottom. In other embodiments, the thermal strip heater 110 may be located on a portion of a side of the SOI waveguide 122, rather than on the top of the SOI waveguide 122.

The SOI waveguide 122 includes a silicon core 106 embedded in a silicon dioxide cladding 120 and is supported by a plurality of heat restricting pillars 108 such that the SOI waveguide 122 is substantially thermally isolated from the surrounding silicon dioxide cladding 102, 104 and the silicon substrate 114 by gaps and trenches 116. The pillars 108 provide stability to the SOI waveguide 122 while substantially minimizing the thermal contact area thereby reducing heat flow into the silicon dioxide regions 102, 104 and the silicon substrate 114. The gaps and trenches 116 may be a vacuum or may be filled with a thermally non-conducting material such as, for example, air. Area 112 illustrates one pillar 108 separated from other pillars 108 by trenches 116. The pillars 108 include a portion that sits on a column of silicon as shown in FIG. 2. In an embodiment, the pillars 108 extend from the silicon dioxide regions 102, 104 toward the sides of the SOI waveguide 122 such that the area touching the SOI waveguide 122 is significantly narrower than the opposite end of the pillars 108. In an embodiment, the pillars 108 have a substantially trapezoidal shape or structure. In other embodiments, the pillars 108 have a substantially conical shape or structure. The heat restricting pillars 108 minimizes thermal contact with the SOI waveguide 122 thereby substantially minimizing heat flow from the SOI waveguide 122 into the silicon dioxide cladding layer 102, 104 and the silicon substrate 114. The heat restricting pillars 108 also enhance the mechanical stability lifetime operation of the TO switch. The heat restricting pillars 108 are attached to supporting structures 130 that sit on top of the substrate 116.

In an embodiment, the bottom of the SOI waveguide 122 (e.g., the portion nearest the silicon substrate) does not touch the silicon substrate and is not in thermal contact with any material other than a substantially thermally non-conducting material, such as, for example, air. In an embodiment, the sides of the SOI waveguide 122 are not in thermal contact with the silicon dioxide regions 102, 104 except at the small areas in which the pillars 108 are on contact with the SOI waveguide 122. In an embodiment, the ends 124, 126 of the SOI waveguide 122 may be in contact with another waveguide or other material.

In an embodiment, the width, w, of the SOI waveguide 122 is between about 2.0 microns and about 3.0 microns. In another embodiment, the width, w, of the SOI waveguide 122 is about 2.9 microns. In an embodiment, the height, h, of the SOI waveguide 122 is between about 1.5 microns and about 2.5 microns. In another embodiment, the height, h, of the SOI waveguide 122 is about 2.1 microns.

Figure 4:
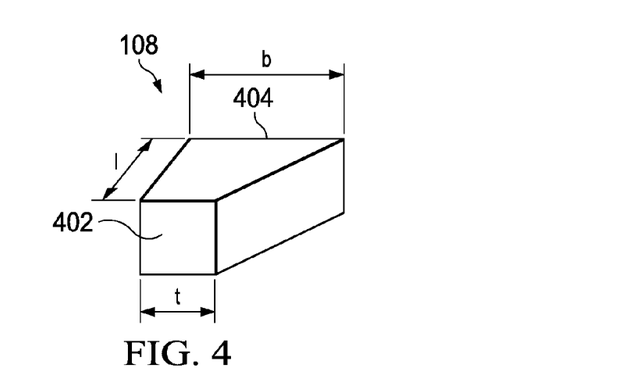
FIG. 4 illustrates an embodiment of a heat restricting pillar.

FIG. 4 illustrates an embodiment of a heat restricting pillar 108. In an embodiment, the face or surface 402 of the heat restricting pillar 108 that is connected to a portion of a SOI waveguide has a width, t, that is smaller than the width, b, of the opposite surface 404 that is connected to a supporting structure. The heat restricting pillar 108 also has a length, l, from the edge of the SOI waveguide 122 to the supporting structure 130. In an embodiment, t is about 1 micron, b is in the range of about 1.8 microns to about 2.5 microns, and l is in the range of about 2 microns to about 3 microns. This shape substantially minimizes contact with the SOI waveguide thereby reducing heat flow from the SOI waveguide to the surrounding supporting structure and the substrate. As shown, in an embodiment, the heat restricting pillar 108 is substantially trapezoidal in shape.

Figure 5:
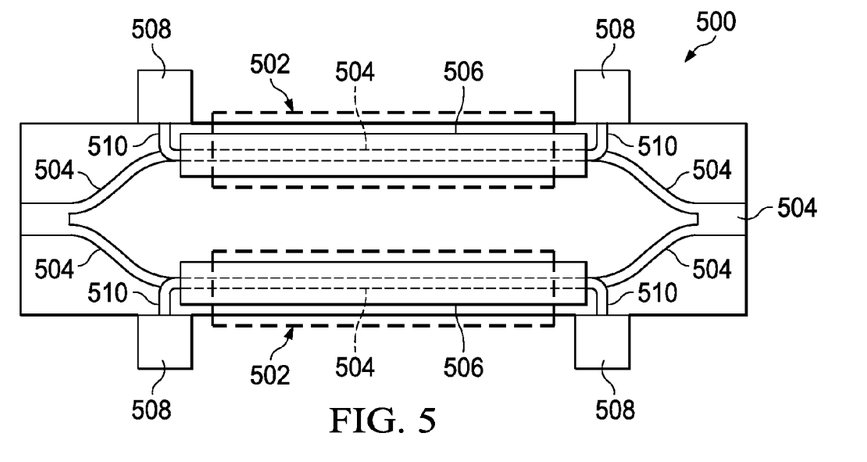
FIG. 5 illustrates a top plan view of an embodiment of a MZI TO switch in a 1×2 configuration.

FIG. 5 illustrates a top plan view of an embodiment of a MZI TO switch 500 in a 1×2 configuration. The MZI TO switch 500 includes two TO regions 502, electrical bonding pads 508, and trace connectors 510. The trace connector 510 (e.g., electrical wire) allows current flow from electrical bonding pad 508 to the resistive thermal strip heater 506. Each of TO regions 502 include a TO switching element such as, for example, TO switching element 100 depicted in FIGS. 1-3. The MZI TO Switch 500 includes an optical waveguide 504 that is split such that optical signals propagate the two TO regions 502. Each TO region 502 includes a thermal strip heater 506. As shown, phase tuning can be done in both arms of the MZI. In other embodiments, phase tuning can be done in one arm only.

Embodiments of the disclosure enable a large number (e.g., on the order of 6,000 to 25,000 depending on the particular application) of optical switching elements per square inch of die based on MZI with TO elements, which can be arranged in 1×2 or 2×2 cells. Embodiments of the disclosure integrate the TO switch cell on SOI technology.

The phase shift, $\Delta\phi$, and the output power, $P_1$ and $P_2$, are related. The phase shift, $\Delta\phi$, of the optical signal provided by the MZI TO switch 500 is given by the following equation:

$$\Delta\varphi = \frac{2\pi \frac{dn}{dT} \Delta TL}{\lambda}.$$

where $$\frac{dn}{dT}$$

is the thermo-optic coefficient of the waveguide 504, $\Delta T$ is the change in temperature of the waveguide 504, $\lambda$ is the wavelength of the optical signal, and L is the length of the thermal strip heater 506. The output power, $P_1$ and $P_2$, are given by the following equations:

$$P_1 = P_0\cos^2\frac{\Delta\varphi}{2} \text{ and } P_2 = P_0\sin^2\frac{\Delta\varphi}{2}.$$

Silicon has a relatively large thermo-optic coefficient, $$\frac{dn}{dT}.$$

For the $$\frac{dn}{dT} = 1.86 \times 10^{-4} K^{-1},$$

where K is a Kelvin, a ΔT of only a few degrees is required for a phase shift of π. $P_1$ and $P_2$ are the optical power at each output of the MZI TO switch 500. The output can be a 2×2 multimode interference (MMI) device or a 2×2 directional coupler (splitter). $P_0$ is the input optical power.

Figure 6:
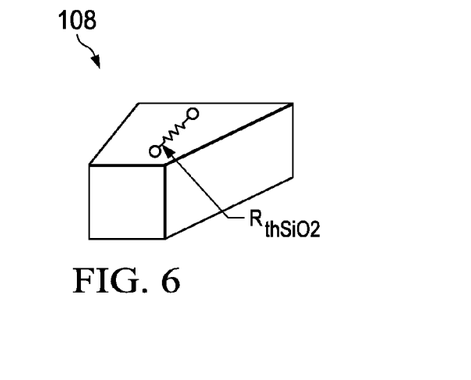
FIG. 6 illustrates an embodiment heat restricting pillar showing the schematic representation of thermal resistance, $R_{th,SiO2}$.

FIG. 6 illustrates an embodiment heat restricting pillar 108 showing the thermal resistance, $R_{thSiO2}$. Heat is dissipated in the resistor (i.e., the heat restricting pillar 108) by electrical loss (Joule effect), resulting in a ΔT (K) rise. Similar to Ohm's law for electrical conduction, heat flow due to temperature gradient depends mainly on thermal resistance of the device. The thermal resistance, $R_{th}$, depends on the thermal conductivity, device geometry, and path configuration. Thus, the thermal resistance, $R_{th}$, may be represented by:

$$R_{th} = \frac{T_{max} - T_A}{P_d} = \frac{1}{k_{th}}\frac{L}{A}.$$

In an embodiment, the heat flow restricting pillar, such as, for example, heat restricting pillars 108, increases $R_{th}$ by reducing the surface area of contact with the suspended waveguide. Increasing surface area of contact with the supporting base enhances mechanical strength and rigidity. Thermal isolation of the heat restricting pillars 108 and the SOI waveguide 122 increases $R_{th}$ by introducing air (or other high $k_{th}$) into the heat flow path.

Figure 7:
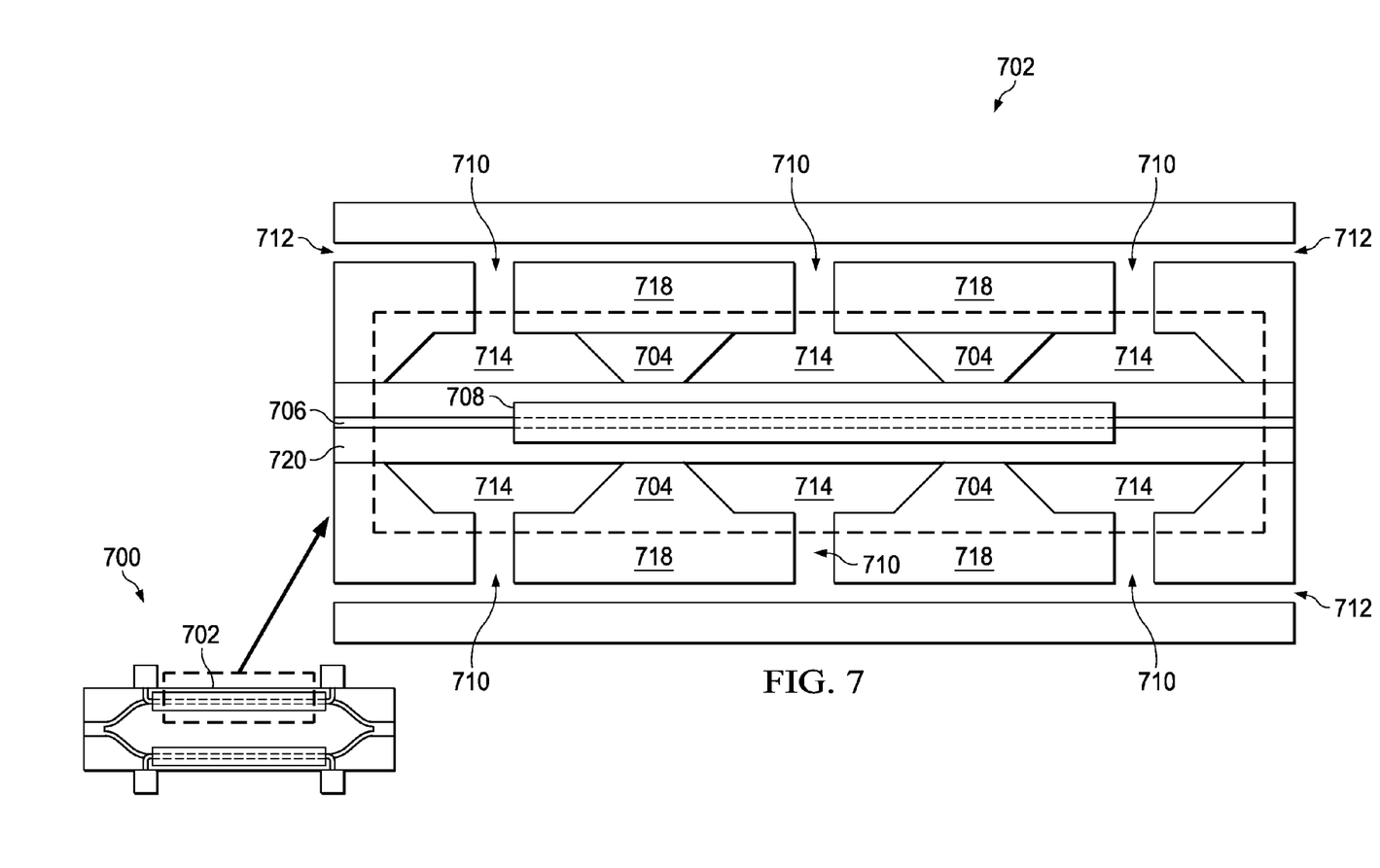
FIG. 7 illustrates a schematic detailed view of one arm of an embodiment MZI TO switch and part of a neighboring switch.

FIG. 7 illustrates an embodiment MZI TO switch 700. In an embodiment, MZI TO switch 700 is implemented as MZI TO switch 500 depicted in FIG. 5. An expanded top planar view of one of the TO regions 702 is shown. The TO region 702 includes a plurality of heat restricting pillars 704 suspending an optical waveguide 720 above a silicon substrate (not shown) such that the optical waveguide 720 is not in thermal contact with the substrate. The heat restricting pillars 704 are supported by SiO$_2$ supports deposited on a silicon substrate. The optical waveguide 702 includes a silicon core 706 embedded in a silicon dioxide cladding with a thermal strip heater 708 overlaying the silicon dioxide cladding. Each heat restricting pillar 704 is attached to supporting structures 718 that sit on top of the substrate. Each heat restricting pillar 704 is separated from other heat restricting pillars by a thermal isolation deep etch trench 710 and the optical waveguide 720 is separated from the SiO$_2$ supports and the silicon substrate by thermal isolation deep etch trenches 714. Neighboring TO switching elements are also separated by thermal isolation deep etch trenches 712.

The thermal isolation deep etch trenches 710, 712, 714 increase path thermal resistance.

Figure 8:
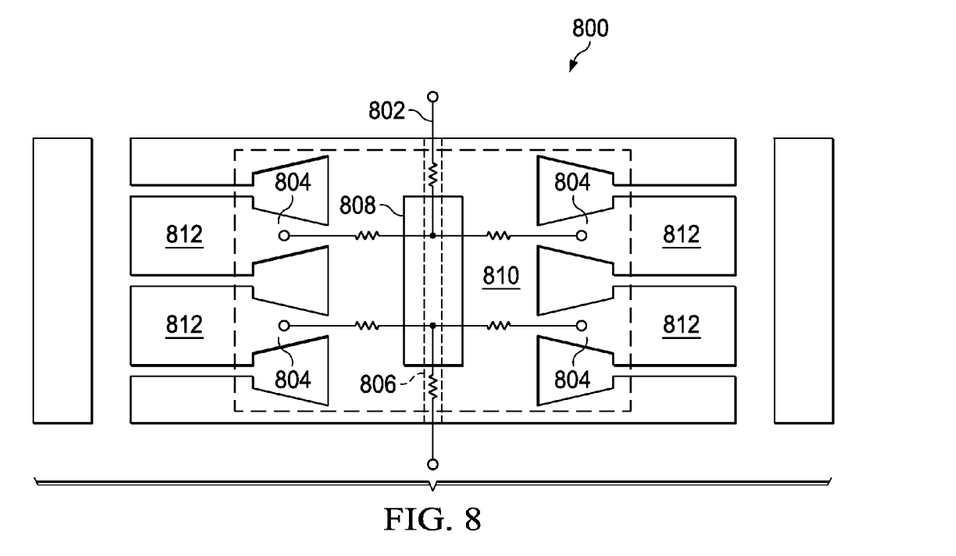
FIGS. 8-10 illustrate an embodiment TO switching element with an equivalent circuit representation overlaid.
Figure 9:
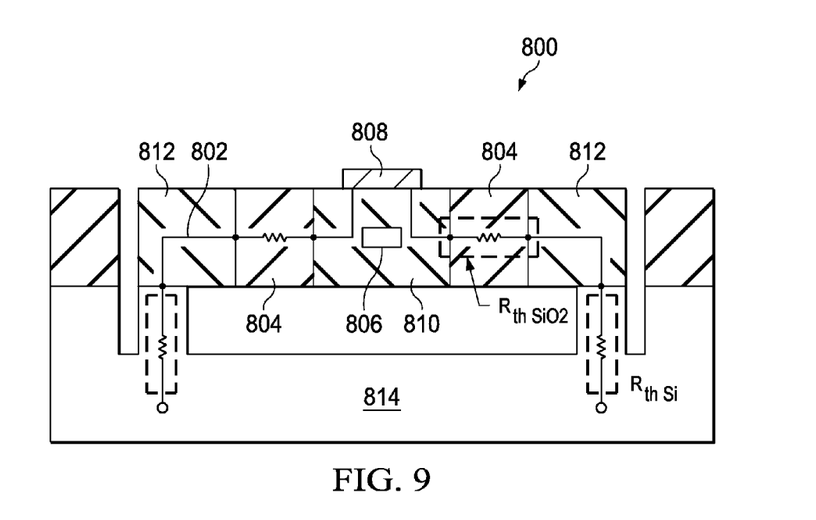
Figure 10:
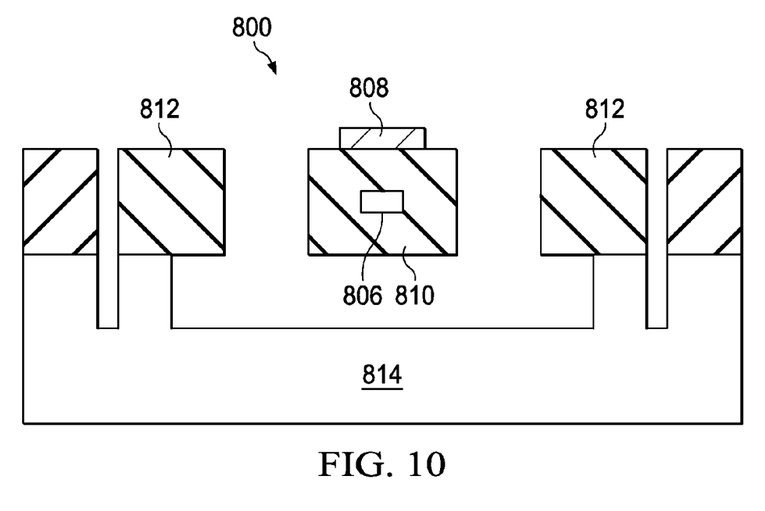
Figure 11:
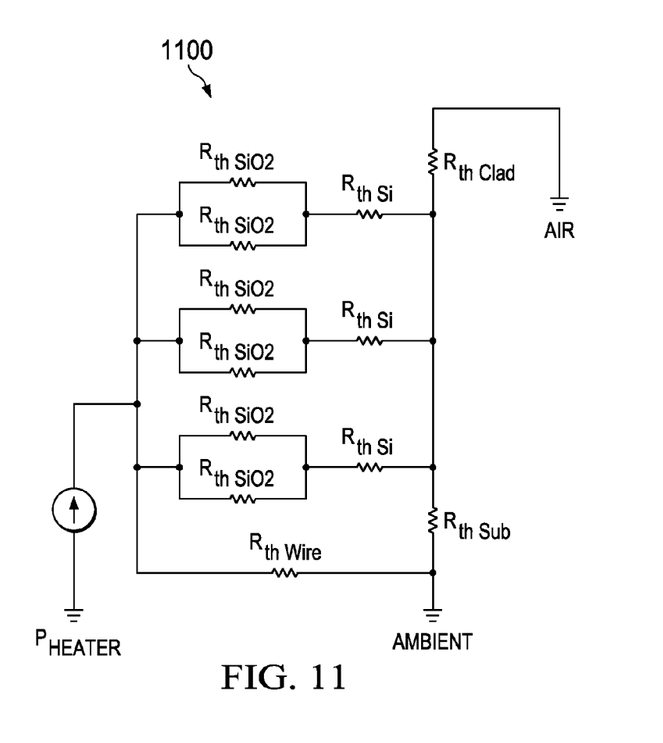
FIG. 11 illustrates an embodiment equivalent circuit representation of a TO switching element.

FIGS. 8-10 illustrate an embodiment TO switching element 800 with an equivalent circuit 802 representation overlaid. FIG. 11 illustrates an embodiment equivalent circuit 1100 representation of TO switching element 800. In an embodiment, the TO switching element 800 is implemented as TO switching element 100 in FIG. 1. In an embodiment, elements 804, 806, 808, 810, 812, and 814 correspond to similar elements 108, 106, 110, 120, 130, and 114 in FIG. 1. The thermal resistance of each of the heat restricting pillars 804 is $R_{th\ SiO2}$. The thermal resistance of the silicon core 806 in the optical waveguide 810 is $R_{th\ Si}$. The thermal resistance of the cladding on the optical waveguide 810 is $R_{th\ Clad}$. The thermal resistance of the substrate is $R_{th\ Sub}$. The power of the thermal strip heater 808 is $P_{Heater}$. $R_{th\ SiO2}$ becomes the main path for heat dissipation into the substrate 814. Increasing $R_{th\ SiO2}$ value impacts the overall power budget. $R_{th\ Air}$ splits the heat paths through the SiO$_2$ heat restricting pillars 804. $R_{th\ wire}$ represents heat the heat flow through the electrical wires connecting the electric heater to the outside environment. This could be through wire bonding or flip-chip bonding.

Figure 12:
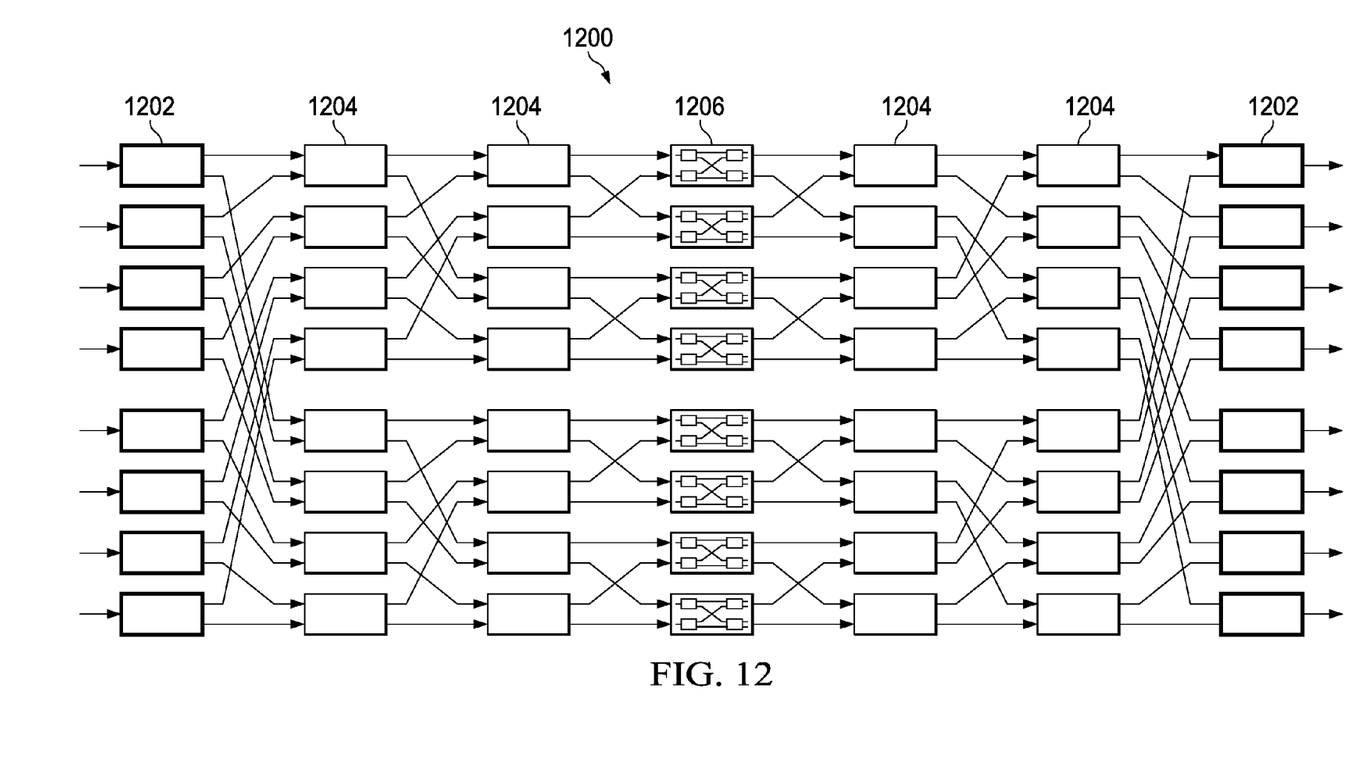
FIG. 12 is a block diagram of an embodiment photonic integrated circuit (PIC)

FIG. 12 is a block diagram of an embodiment PIC 1200. PIC 1200 includes a plurality of switching cells 1202, 1204, 1206. Some of the switching cells 1202, 1204, 1206 include more than one switching cell. For example, in an embodiment, switching cell 1206 contains four 1×2 switching cells for improved cross-talk. PIC 1200 may also include other components not shown. In an embodiment, one or more of the switching cells 1202, 1204, 1206 include the disclosed thermo-optic switch with thermally isolated and heat restricting pillars as described above. In an embodiment, each switch cell size is about 100 microns by about 400 microns in size. In an embodiment, the switching power for each switch is about 0.3 mW to about 0.5 mW. In an embodiment, more than 6000 switch cells per square inch of die can be included per die.

Figure 13:
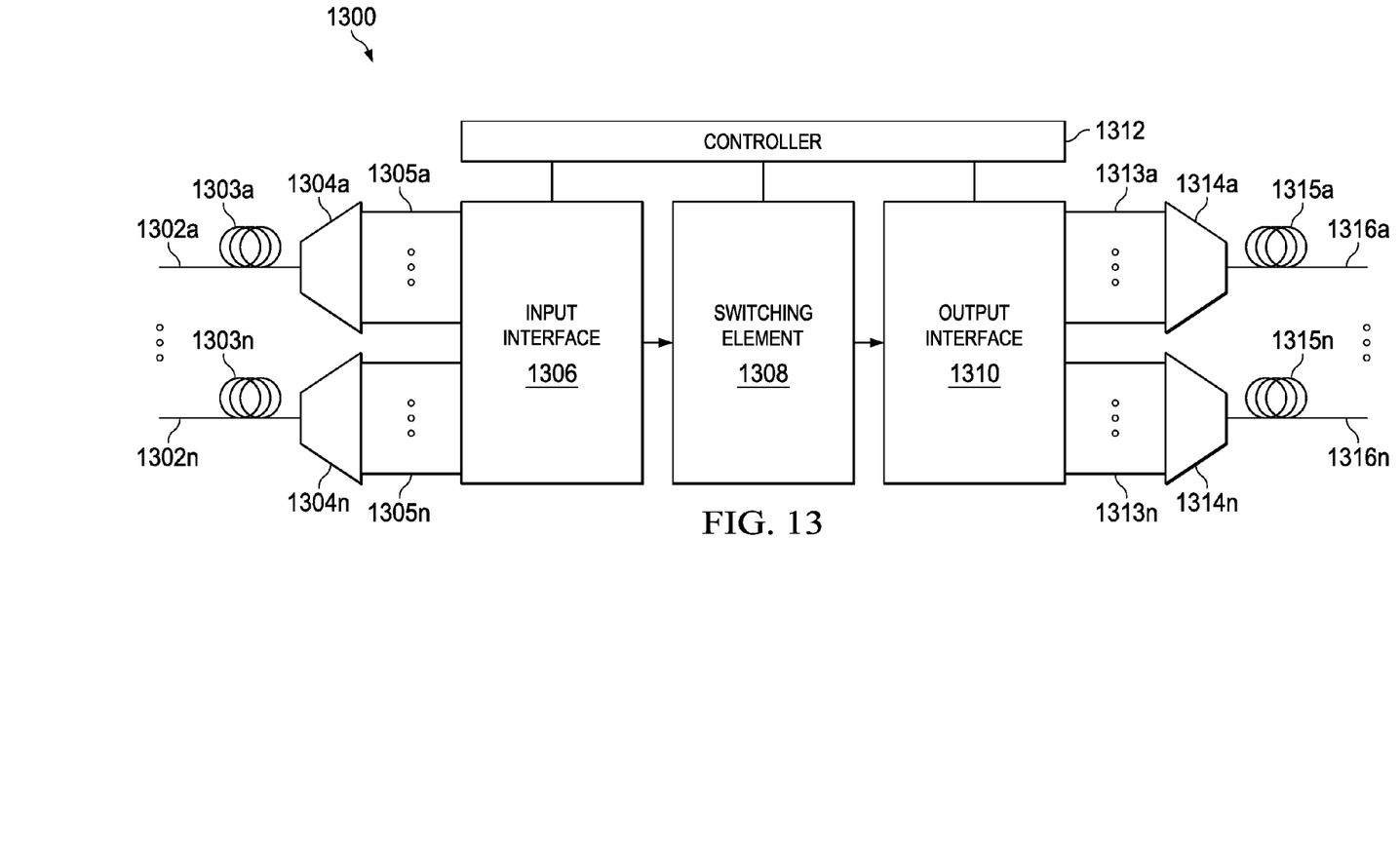
FIG. 13 is a block diagram of an embodiment optical data router.

FIG. 13 is a block diagram of an embodiment optical data router 1300. Optical data router 1300 may be used for implementing the devices and methods disclosed herein. Specific devices may utilize all of the components shown, or only a subset of the components and levels of integration may vary from device to device. Furthermore, a device may contain multiple instances of a component. Router 1300 includes one or more separators 1304, an input interface 1306, a switching element 1308, an output interface 1310, a controller 1312, and one or more combiners 1314. Each separator 1304 is configured to separate an input optical signal 1303 communicated over a communication link 1302. Separator 1304 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 1306, switching element 1308, and/or output interface 1310 include a PIC that incorporates the disclosed thermo-optic switches with thermally isolated and heat restricting pillars.

Communication link 1302 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 1302 is configured to couple router 1300 to other optical and/or electro-optical components. For example, link 1302 could couple router 1300 to a cross-connect or another device operable to terminate, switch, route, process, and/or provide access to and/or from communication link 1302 and another communication link or communication device. As used throughout this document, the term "couple" and or "coupled" refers to any direct or indirect communication between two or more elements, whether or not those elements are physically connected to one another. In some embodiments, communication link 1302 can comprise a point-to-point communication link or a portion of a larger communication network, such as a ring network, a mesh network, a star network, or other network configuration.

Optical signal 1303 may include a multiple wavelength optical signal. For example, optical signal 1303 can include at least 5 wavelength channels, at least 100 wavelength channels, or at least 250 wavelength channels. In one particular embodiment, optical signal 1303 includes 250 wavelengths having a 50 gigahertz (GHz) spacing within a 100 nanometer (nm) spectral window. In that example, the 100 nm spectral window can be located within the 1400 nm to 1650 nm low-loss window associated with optical fibers. In various embodiments, optical signal 1303 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 1304 is configured or operates to separate optical signal 1303 into individual wavelength channels 1305 and to couple each wavelength channel 1305 to an input interface 1306. In an alternative embodiment, separator 1304 can separate optical signal 1303 into separate multiple-wavelength channels and couple those multiple-wavelength channels to input interface 1306. Wavelength channels 1305 can comprise, for example, Internet Protocol (IP) packets, voice data, video data, or any other data type and/or data format. In this particular embodiment, each wavelength channel 1305 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 1305, however this format is not required. In this example, each wavelength channel 1305 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 1306 is configured to receive and process each wavelength channel 1305 associated with optical signal 1303. Input interface 1306 can comprise any optical and/or electrical components—including any hardware, software, and/or firmware—capable of processing, converting, replicating, updating, and/or swapping one or more packet labels associated with each wavelength channel 1305. In various embodiments, input interface 1306 can determine a desired routing for a packet data associated with each wavelength channel 1305 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 1306 may include a controller that receives an electrical representation of a packet label and generates a control signal that functions to modulate a swapping sequence on an optical signal.

Switching element 1308 is configured to process one or more packet data associated with wavelength channels 1305 received from input interface 1306 and directing those packet data to a desired destination. Switching element 1308 can include any optical and/or electrical components—including any hardware, software, and/or firmware—capable of switching, routing, error checking, and/or managing the one or more packet data or packet labels associated with each wavelength channel 1305. In an embodiment, switching element 1308 can comprise a ring configuration having one or more core router nodes and at least one management node. Although this example implements a ring configuration, switching element 1308 could implement a mesh configuration, a star configuration, or any other configuration without departing from the scope of the present disclosure. In various embodiments, switching element 1308 can operate to process wavelength channels 1305 at processing speeds of, for example, at least 10 gigabits/second (Gb/s), at least 40 Gb/s, at least 100 Gb/s, or at least 160 Gb/s.

In an embodiment, switching element 1308 is configured to route one or more packet data associated with wavelength channels 1305 to an output interface 1310. Output interface 1310 can comprise any optical and/or electrical components including any hardware, software, and/or firmware capable of preparing one or more packet data associated with wavelength channels 1305 for communication from router 1300. In this example, output interface 1310 operates to communicate the one or more packet data from router 1300 to a desired destination through an appropriate wavelength channel 1313.

In an embodiment, each combiner 1314 is configured to combine output wavelength channels 1313 into one or more output optical signals 1315 for communication over a communication links 1316. In an embodiment, combiner 1314 includes, for example, a wavelength division multiplexer. The structure and function of communication link 1316 can be substantially similar to the structure and function of communication link 1302. In this example, communication links 1316 operate to couple router 1300 to other optical and/or electro-optical components.

In this example, the controller 1312 is also capable of at least partially contributing to controlling one or more functionalities associated with router 1300. That is, controller 1312 is not required to be capable of performing the desired functionality alone, but may contribute to the performance of the function as part of a larger routine. Controller 1312 can comprise any communication and/or computational device or devices, including any hardware, software, firmware, or combination thereof.

In an embodiment, in operation, the packet data associated with wavelength channels 1305 are transparent to the processing functions of router 1300. That is, in operation router 1300 does not examine the content of the packet data associated with each wavelength channel 1305. In some cases, router 1300 does examine the contents of one or more packet labels and/or other elements of a frame format associated with wavelength channels 1305. In most cases, router 1300 operates to maintain the packet data associated with wavelength channels 1305 in the optical domain. That is, the packet data associated with each wavelength channel 1305 are not subjected to an optical-to-electrical conversion by router 1300. In some cases, one or more of the packet labels and/or other elements of a frame format associated with wavelength channels 1305 can be subjected to one or more optical-to-electrical and/or electrical-to-optical conversions. In various embodiments, router 1300 may be capable of an aggregate capacity of, for example, at least 5 terabits/second (Tb/s), at least 25 Tb/s, at least 50 Tb/s, or at least 100 Tb/s.

In an embodiment, router 1300 can operate to minimize and/or avoid contention between packet data associated with optical signals 1303 and 1315 and/or wavelength channels 1305 and 1313 within switching element 1308 and/or communication links 1302 and 1316. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A thermo-optic switch, comprising:
   an optical waveguide;
   a resistive heater in thermal contact with a surface of the optical waveguide; and
   a plurality of heat flow restricting pillars connected to sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars,
   wherein a surface of each of the pillars closest to the optical waveguide is smaller than a surface of each of the pillars farthest from the optical waveguide, and
   wherein a width of the surface of each of the pillars closest to the optical waveguide is about 1 micron and a width of the surface of the pillars farthest from the optical waveguide is in a range of about 1.8 microns to about 2.5 microns.

2. The thermo-optic switch of claim 1, wherein the pillars are substantially isolated from each other.

3. The thermo-optic switch of claim 1, wherein the pillars are separated from each other by trenches.

4. The thermo-optic switch of claim 3, wherein the trenches and the gap comprise one of air and a vacuum.

5. The thermo-optic switch of claim 1, wherein each of the pillars comprises a substantially trapezoidal shape.

6. The thermo-optic switch of claim 1, wherein each of the pillars comprises a substantially conical shape.

7. The thermo-optic switch of claim 1, wherein the pillars comprise silicon dioxide.

8. A network component configured for manipulating optical signals, the network component comprising:
   a processor;
   a receiver connected to the processor; and
   a photonic integrated circuit (PIC) connected to the receiver, wherein the PIC comprises a plurality of thermo-optical switches, wherein each of the thermo-optical switches comprises:
     an optical waveguide;
     a resistive heater in thermal contact with a surface of the optical waveguide; and
     a plurality of heat flow restricting pillars connected to sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars,
   wherein a surface of each of the pillars closest to the optical waveguide is smaller than a surface of each of the pillars farthest from the optical waveguide, and
   wherein a width of the surface of each of the pillars closest to the optical waveguide is about 1 micron and a width of the surface of the pillars farthest from the optical waveguide is in a range of about 1.8 microns to about 2.5 microns.

9. The network component of claim 8, wherein the pillars are substantially isolated from each other.

10. The network component of claim 8, wherein the pillars are separated from each other by trenches.

11. The network component of claim 10, wherein the trenches and the gap comprise one of air and a vacuum.

12. The network component of claim 8, wherein each of the pillars comprises a substantially trapezoidal shape.

13. The network component of claim 8, wherein each of the pillars comprises a substantially conical shape.

14. The network component of claim 8, wherein the pillars comprise silicon dioxide.

15. The network component of claim 8, wherein the PIC comprises at least 6,000 of the thermo-optical switches per square inch.

16. A photonic integrated circuit (PIC), comprising:
   a plurality of optical inputs; and
   a plurality of thermo-optic switches connected to the inputs, wherein each of the thermo-optic switches comprises:
     an optical waveguide;
     a resistive heater in thermal contact with a surface of the optical waveguide; and
     a plurality of heat flow restricting pillars connected to sides of the optical waveguide and supporting the optical waveguide such that the optical waveguide is substantially thermally isolated from a substrate below the optical waveguide by a gap formed between the optical waveguide and the substrate, and wherein the pillars restrict heat flow from the optical waveguide to a supporting structure that supports the pillars, wherein a surface of each of the pillars closest to the optical waveguide is smaller than a surface of each of the pillars farthest from the optical waveguide, and wherein a width of the surface of each of the pillars closest to the optical waveguide is about 1 micron and a width of the surface of the pillars farthest from the optical waveguide is in a range of about 1.8 microns to about 2.5 microns.

17. The PIC of claim 16, wherein the pillars are substantially isolated from each other.

18. The PIC of claim 16, wherein the pillars are separated from each other by trenches.

19. The PIC of claim 18, wherein the trenches and the gap comprise one of air and a vacuum.

20. The PIC of claim 16, wherein each of the pillars comprises a substantially trapezoidal shape.

21. The PIC of claim 16, wherein each of the pillars comprises a substantially conical shape.

22. The PIC of claim 16, wherein the pillars comprise silicon dioxide.

23. The PIC of claim 16, wherein the PIC comprises at least 6,000 of the thermo-optical switches per square inch.

* * * * *